Sept. 7, 1943.    C. B. LEAPE    2,329,062
ABRASION TESTER FOR WIRE COATINGS
Filed Dec. 3, 1942
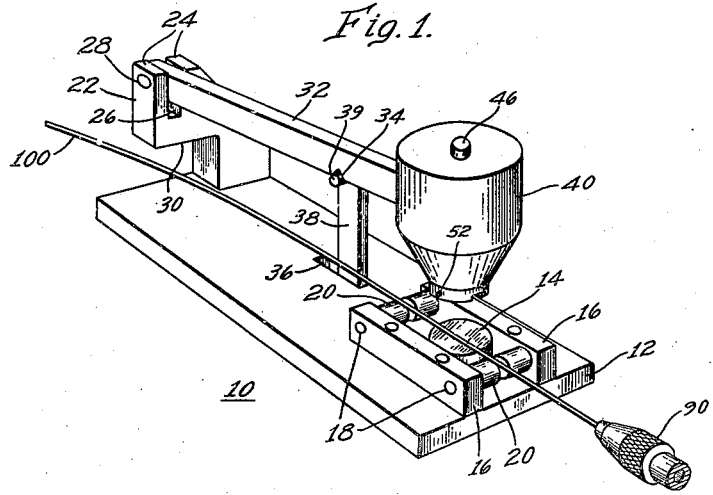
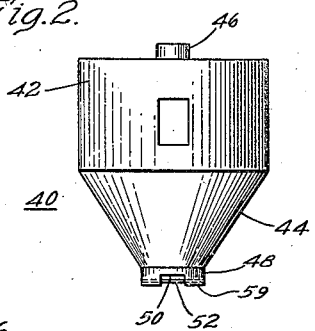
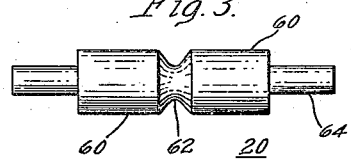
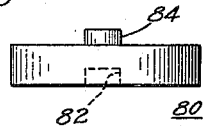
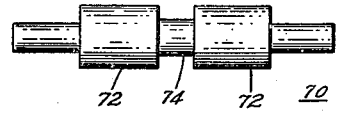
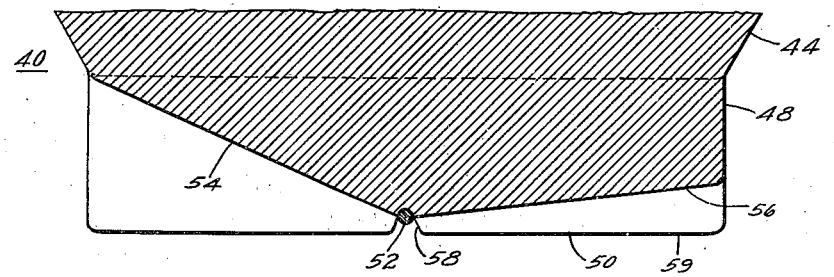
WITNESSES:
C. J. Weller.
T. Shapoe
INVENTOR
Charles B. Leape.
BY Ezra W. Savage
ATTORNEY Patented Sept. 7, 1943

2,329,062

UNITED STATES PATENT OFFICE 2,329,062

ABRASION TESTER FOR WIRE COATINGS

Charles B. Leape, Forest Hills, Pa., assignor to Westinghouse Electric & Manufacturing Company, East Pittsburgh, Pa., a corporation of Pennsylvania Application December 3, 1942, Serial No. 467,737

7 Claims. (Cl. 73—51)

This invention relates to apparatus for testing coatings such as enameled wire coatings in order to determine their physical properties.

In particular, this invention is directed to an apparatus for determining the relative toughness and hardness of applied enamels and other coatings on wire, conductors and the like. The toughness of applied enamels is an important characteristic which greatly determines the extent to which a wire carrying the enamel can be stretched or deformed or subjected to other physical abuse without the enamel cracking or separating from the wire. Accordingly, an accurate determination of the relative toughness of such coatings is an important factor in selecting enameled wire for any given purpose.

It is usually accepted in the art that the best single measure of the toughness of enameled coatings is their resistance to scraping or abrasion under load. Therefore, an accurate testing device for determining or measuring the abrasion or scrape resistance of enamel coatings on wire enables an accurate determination of the relative toughness thereof.

Heretofore relatively simple testing devices were employed in determining the scrape resistance of coatings of enamel on conductors. Some form of knife edge capable of being weighted different amounts and a base or anvil associated with the knife edge constituted the essential elements of such testing devices. By drawing a short length of wire between the weighted knife edge and anvil and visually examining the state of the enamel coating after such test, it is possible to determine whether or not the coating failed under the given load. A number of tests with increasing loads on the knife edge will give the point of failure of the coating. The maximum weight that the coating will sustain during the test before failing is taken as the scrape resistance of the enamel or coating.

It has been discovered that scrape values produced by the use of some of the testing devices commonly employed heretofore are quite erratic and not subject to easy duplication. The direction at which the coated wire is drawn relative to the knife edge has been found to be exceedingly critical. Slight changes in direction of pull give undue changes in the scrape resistance of the enamel or other coatings.

A careful examination of the conventional type of knife edge employed in numerous devices has indicated that the knife edge is subject to an undesirable degree of wear resulting in alteration of its form whereby the results are not comparable with those made by a newly built device. The knife edge has been found to distort during the test due to the way the knife edge is built and how it is mounted.

The method of loading the knife edge has been found to be defective in numerous cases, since the weights at times have been found to bind in a retainer or positioning device whereby less than the total weight is disposed on the knife edge. This list of unsatisfactory features of known types of scrape testers is not exhaustive but simply indicative of the more obvious defects.

The object of this invention is to provide a testing device that determines accurately and reproducibly the relative scrape values of enameled wire coatings.

A further object of the invention is to provide a testing device that is not subject to material deterioration with use for accurately and reproducibly determining the scrape values of applied coatings on wire.

Other objects of the invention will in part appear hereinafter.

For a fuller understanding of the nature and objects of the invention, reference should be had to the drawing wherein, Figure 1 is a view in perspective of the improved scrape testing device, Fig. 2 is an enlarged view in elevation of the pressure head, Fig. 3 is an enlarged view in elevation of the roller guide, Fig. 4 is an enlarged view in elevation of a modified form of roller guide, Fig. 5 is a greatly enlarged fragmentary cross section of the bottom portion of the pressure head of Fig. 2, and Fig. 6 is a side elevational view of a weight.

Referring to Fig. 1 of the drawing, there is shown a complete testing device 10 embodying the improvements of this invention. The coated wire 100, for example, an enameled copper conductor, is shown as being subjected to a pull by the chuck 90 operable by mechanical means. In lieu of the chuck 90, the enameled wire 100 may be drawn manually or in any other desired fashion.

The testing device 10 comprises a support member 12 to which the anvil 14 is rigidly attached. On either side of the anvil 14 are two blocks 16 likewise rigidly attached to the support member 12 having apertures 18 in which roller guide means 20 are fitted therein. The roller guide means 20 are so associated with the anvil 14 that a coated wire being tested is accurately positioned horizontally and vertically with respect to the face of the anvil.

One of the guide rolls 20 is shown in greater detail in the enlarged view in Fig. 3. The guide roll 20 consists of a cylindrical body 60 having a centrally disposed notch 62 suitably rounded at the bottom to provide for a great variety of conductors resting therein. At both ends of body 60 are trunnions 64 engageable in the apertures 18 in the block 16.

Referring to Fig. 4 of the drawing, there is illustrated a modified form of guide roll 70. The cylindrical portions 72 of the guide roller are similar to those of the Fig. 3 construction. The centrally disposed notch or guide 74 consists of a substantially rectangular shape channel. Any size wire that will fit into this channel will ride upon the small diameter which coincides with the face of the anvil 14, and, therefore, all sizes of wire will be accurately positioned.

At the rear of the support member 12 is located an upstanding bracket 22 having bifurcated lugs 24 providing a channel 26. The member 22 is recessed at 30 to provide a clear space for the passage of the coated wire 100. Supported within the channel 26 is an arm 32 pivotally mounted upon the bifurcated lugs 24 by means of pin 28. The arm 32 carries at its opposite end a pressure head 40 having a knife edge means for testing the scrape resistance of the coating on the wire 100. The arm 32 has a notch 34 with which a pin 39 of rest 38 may engage to hold the pressure head 40 elevated while test wire 100 is being applied in position preliminary to a test. The rest 38 is pivotally mounted on a pivot (not shown) in the slot 36 in the support member 12.

For a better showing of the details of the pressure head 40, reference should be had to Fig. 2 of the drawing. The pressure head 40 consists of an upper cylindrical body 42 and a lower inverted conical body portion 44. At the top of the cylindrical body portion 42, a lug 46 is located for retaining added weights similar to weight 80 of Fig. 6 when these weights are applied to the pressure head to secure desired loads. The weight 80 has a depression 82 fitting upon lug 46 upon one surface and carries a lug 84 similar to lug 46 on the other surface whereby a plurality of weights may be readily put on and retained in position by the pressure head 40.

At the bottom of the pressure head 40 is a portion 48 having the channel 50 in which is transversely disposed a knife edge consisting of a suitably dimensioned wire. For a better understanding of the construction of this bottom portion, reference should be had to the greatly enlarged cross sectional view in Fig. 5. The channel 50 is defined by upper walls 54 and 56 tapering upwardly from the point of contact with the wire 52. A groove 58 transverse of the channel 50 is cut across the bottom portion 48 with a bottom radius corresponding to that of the wire 52. The groove 58, however, is deeper than the diameter of the wire whereby when the wire is disposed therein, several thousandths of an inch clearance exists between the face 59 of the bottom portion and the wire 52. This prevents damage to either the knife edge wire 52 or to the anvil 14 when the pressure head 40 rests directly on the anvil. By means of the construction shown the face 59 is the only part of the pressure head that will rest on the anvil.

To secure the most durable form of construction, the wire 52 should be made of some hard metal or alloy. A tungsten carbide wire, for example, or a high grade piano wire is suggested for this purpose. The wire 52 is preferably soldered throughout its entire length at that portion defining the point of contact between the groove 58 and the wire 52. A hard solder is believed preferable for this purpose but lead-tin solder or other means of effecting a substantially permanent and rigid attachment of the wire to the pressure head may be employed. After the solder has been applied, any excess should be carefully removed by scraping, sand papering or otherwise treating that portion of the exposed wire in the channel which may have been covered with solder.

When subjected to test, the wire 52 due to its hard metal nature and the fact that it is soldered throughout its length will greatly resist wear and deterioration due to bowing and the like. The short length of wire in the channel 50 also will prevent undue stresses being set up as would exist if the knife edge were a longer wire of an inch or so in length supported only at both ends.

The upper surface 54 of the channel is relatively steep in order to provide for the collection and accommodation of a large amount of scraped enamel or coating material behind the knife edge wire 52 as the wire is being tested without the tendency of the scrapings lifting the pressure head upward. Otherwise the channel 50 is so designed in relation to the wire 52 that a maximum of lateral and vertical support is given the wire.

In order to operate the device 10, the rest 38 is turned clockwise to elevate the pressure head 40 by the test engaging the arm 32 until the notch 34 and pin 39 meet. A sample of coated wire 100 is applied over the guide rollers 20 whereby it is disposed over anvil 14. The pressure head is loaded by adding suitable weights upon pin 46. By turning the rest 38 counterclockwise, the pressure head 40 will drop and the knife edge therein engages the wire 100. A pull by the chuck 90 or by other suitable means draws the coated wire 100 under the pressure head. The direction of pull is accurately controlled by the guides 20. After pulling, the tested wire is examined visually to determine whether or not it has failed. Other means may be provided for determining the failure of the coating on the wire. If the coating holds up, additional samples of coated wire are tested under increasing loads until failure of the coating occurs.

Illustrative of the benefits of the construction shown for the strip tester, the following table is given:

Table I

A. NORMAL RATE OF PULL

[No. 19 Wire—normally rated 25 oz. scrape.]

| Scrape oz. | Effect | |
|---|---|---|
| | Abraded | Off |
| 20 | 4 sides abraded | 1 side partially off. |
| 20 | 1 side abraded | 3 sides off. |
| 20 | do | Do. |
| 25 | | 4 sides off. |
| 25 | | Do. |

B. CHANGED ANGLE OF PULLING

| 30 | 4 sides abraded | None off. |
| 35 | do | Do. |
| 40 | do | Do. |

The notation "abraded" in the table indicates that the enameled coating when examined under the microscope had been removed in part but the copper conductor had not been reached by the knife edge. The notation "partially off" in the table indicates that in a few spots the knife edge had cut through the coating to the copper while the notation "off" indicates that the enamel of the coating was completely removed under the knife edge and copper had been reached throughout the entire pull.

It will be noted by comparing the two sections of Table I that a normal rate of pull indicates that the wire will fail at all the pressures in the test. While a changed angle of pulling, in this case the wire is pulled up slightly, resulted in none of the enamel or coating failing completely.

The tests embodied in Table I were not performed in the apparatus shown in Fig. 1 of the drawing but in a conventional scrape testing machine employed throughout most of the industry. For a comparison of the much more accurate results obtained by the use of the machine shown in Fig. 1, reference should be had to the following table wherein the same wire was tested:

Table II

[2 inches/second travel.]

| Scrape oz. | Effect | |
|---|---|---|
| | Abraded | Off |
| 29 | 3 sides abraded | None off. |
| 29 | No sides abraded | |
| 29 | do | |
| 30 | 1 side abraded | None off. |
| 30 | 4 sides abraded | 1 side partially off. |
| 30 | do | Do. |
| 31 | 4 sides not abraded | |
| 31 | do | |
| 31 | do | |
| 32 | 4th side abraded | 3 sides off. |
| 32 | 2 sides abraded | 1 side off. |
| 32 | do | Do. |
| 33 | | 4 sides off. |

Since certain changes in carrying out the above processes and certain modifications in the apparatus which embodies the invention may be made without departing from its scope, it is intended that all the matter contained in the above description or shown in the accompanying drawing shall be interpreted as illustrative and not in a limiting sense.

I claim as my invention:

1. A testing device for determining the physical properties of enameled wire coatings comprising, in combination, a support member, an anvil carried by the support member over which enameled wire is drawn, guide means on the support member associated with the anvil for guiding the wire being tested for movement in a predetermined direction, a pressure head above the anvil and disposed on the support member for vertical movement relative to the anvil, the pressure head having a bottom portion channeled and provided with a face for resting on the anvil, the channel in the bottom portion of the pressure head being aligned with the guide means and extending in the direction of movement of wire being tested, and a scrape member carried by the bottom portion of the pressure head and disposed transversely in the channel above the plane of the face for resting on the anvil whereby no load is imposed on the scrape member while the pressure head rests on the anvil.

2. A testing device for determining the physical properties of enameled wire coatings comprising, in combination, a support member, an anvil carried by the support member over which enameled wire is drawn, guide means on the support member associated with the anvil for guiding the wire being tested for movement in a predetermined direction, a pressure head above the anvil and disposed on the support member for vertical movement relative to the anvil, the pressure head having a bottom portion channeled and provided with a face for resting on the anvil, the channel in the bottom portion of the pressure head aligned with the guide means and extending in the direction of movement of wire being tested, and a scrape member carried by the bottom portion of the pressure head and disposed transversely in the channel above the plane of the face for resting on the anvil whereby no load is imposed on the scrape member while the pressure head rests on the anvil, the scrape member comprising a wire of a hard metal of predetermined size extending beyond the channel with the ends thereof fixed into the sides of the bottom portion of the pressure head and the hard metal wire in the channel being rigidly attached to the pressure head by soldering and the like at the point throughout the line of contact of the hard metal wire and the bottom of the channel.

3. A testing device for determining the physical properties of enameled wire coatings comprising, in combination, a support member, an anvil carried by the support member over which enameled wire is drawn, guide means on the support member associated with the anvil for guiding the wire being tested for movement in a predetermined direction, a pressure head above the anvil and disposed on the support member for vertical movement relative to the anvil, the pressure head having a bottom portion channeled and provided with a face for resting on the anvil, the channel in the bottom portion of the pressure head aligned with the guide means and extending in the direction of movement of wire being tested, and a scrape member carried by the bottom portion of the pressure head and disposed transversely in the channel above the plane of the face for resting on the anvil whereby no load is imposed on the scrape member while the pressure head rests on the anvil, the scrape member comprising a wire of hard metal of predetermined size extending beyond the channel with the ends thereof fixed into the sides of the bottom portion of the pressure head and the hard metal wire being rigidly attached to the pressure head by soldering the like at the line of contact of the hard metal wire and the bottom of the channel, and the surface of the bottom of the channel sloping upwardly from the point of contact of hard metal wire to accommodate scraped enamel in the channel.

4. A testing device for determining the scrape values of enameled wire coatings comprising, in combination, a support member, an anvil carried by the support member over which wire being tested is drawn, guide means on the support member associated with the anvil for guiding the wire being tested for movement in a predetermined direction, a pressure head above the anvil, an arm and pivot means on the support member supporting the head for pivotal vertical movement with respect to the anvil member in a plane in line with the direction of movement of the wire, the pressure head having a bottom portion channeled and provided with a face for resting on the anvil, the channel in the bottom portion aligned with the guide means and extending in the direction of movement of the wire, and a scrape member carried by the bottom portion of the pressure head for scraping enamel on wire, the scrape member disposed transversely in the channel above the plane of the face of the bottom portion whereby no load is imposed on the scrape member while the pressure head rests on the anvil.

5. A testing device for determining the scrape values of enameled wire coatings comprising, in combination, a support member, an anvil carried by the support member over which wire being tested is drawn, guide means on the support member associated with the anvil for guiding the wire being tested for movement in a predetermined direction, a pressure head above the anvil, an arm and pivot means on the support member supporting the head for pivotal vertical movement with respect to the anvil member in a plane in line with the direction of movement of the wire, the pressure head having a bottom portion channeled and provided with a face for resting on the anvil, the channel aligned with the guide means and extending in the direction of movement of the wire, a scrape member carried by the bottom portion of the pressure head for scraping enamel on wire, the scrape member disposed transversely in the channel above the plane of the face of the bottom portion of the pressure head whereby no load is imposed on the scrape member while the pressure head rests on the anvil, and a rest on the support member for holding the arm in such a position that the pressure head is above its position of rest on the anvil.

6. In a pressure head for testing coatings on wire comprising, in combination, a body, a bottom portion channeled and provided with a face for resting on an associated anvil member, a knife edge of a hard metal extending transversely of the channel and fixed to the bottom portion, the knife edge disposed above the face of the bottom portion of the pressure head whereby to prevent unnecessary wear or damage to the knife edge, and the channel having an upper side sloping upwardly from the knife edge to accommodate scraped coating material.

7. In a pressure head for testing coatings on wire comprising, in combination, a body, a bottom portion provided with a channel and with a face for resting on an associated anvil member, a knife edge of a hard metal extending transversely of the channel and fixed to the bottom portion, the knife edge disposed above the face of the bottom portion of the pressure head whereby to prevent unnecessary wear or damage to the knife edge, the channel having an upper side sloping upwardly from the knife edge to accommodate scraped coating material, and the knife edge comprising a wire member whose extremities are fixed into the bottom portion of the pressure head and the portion of the wire member in contact with the upper side of the channel being rigidly attached to the bottom portion at the line of contact.

CHARLES B. LEAPE.